US009218629B2

(12) United States Patent
Hartzler

(10) Patent No.: US 9,218,629 B2
(45) Date of Patent: Dec. 22, 2015

(54) PRIORITIZING AND PROVIDING INFORMATION ABOUT USER CONTACTS

(75) Inventor: Matthew Jon Hartzler, Chanhassen, MN (US)

(73) Assignee: BlackBerry Limited, Waterloo, Ontario (CA)

( * ) Notice: Subject to any disclaimer, the term of this patent is extended or adjusted under 35 U.S.C. 154(b) by 961 days.

(21) Appl. No.: 13/354,592

(22) Filed: Jan. 20, 2012

(65) Prior Publication Data

US 2013/0191462 A1    Jul. 25, 2013

(51) Int. Cl.
 *G06F 15/16* (2006.01)
 *G06Q 50/00* (2012.01)
 *G06Q 30/02* (2012.01)

(52) U.S. Cl.
 CPC ............. *G06Q 50/01* (2013.01); *G06Q 30/02* (2013.01)

(58) Field of Classification Search
 USPC ......................................................... 709/206
 See application file for complete search history.

(56) References Cited

U.S. PATENT DOCUMENTS

| | | | | |
|---|---|---|---|---|
| 5,970,231 A | * | 10/1999 | Crandall ...................... | 709/238 |
| 5,970,485 A | * | 10/1999 | Sugaya et al. ................ | 1/1 |
| 6,330,589 B1 | * | 12/2001 | Kennedy ...................... | 709/206 |
| 6,363,390 B1 | * | 3/2002 | Shapiro et al. ................ | 1/1 |
| 6,370,535 B1 | * | 4/2002 | Shapiro et al. ................ | 705/27.1 |
| 6,532,498 B1 | * | 3/2003 | Hager et al. .................. | 719/318 |
| 6,539,375 B2 | * | 3/2003 | Kawasaki ..................... | 1/1 |
| 6,546,488 B2 | * | 4/2003 | Dillon et al. .................. | 713/181 |
| 6,760,916 B2 | * | 7/2004 | Holtz et al. ................... | 725/34 |
| 6,772,146 B2 | * | 8/2004 | Khemlani et al. ........... | 705/36 R |
| 7,797,293 B2 | | 9/2010 | Pabla et al. | |
| 7,873,595 B2 | | 1/2011 | Singh et al. | |
| 8,001,133 B2 | | 8/2011 | Chen | |
| 8,443,005 B1 | * | 5/2013 | Goldman et al. ............ | 707/798 |
| 8,521,763 B1 | * | 8/2013 | Haeg et al. ................... | 707/766 |
| 8,719,255 B1 | * | 5/2014 | Pope et al. ................... | 707/716 |
| 8,751,442 B2 | * | 6/2014 | Ozzie et al. .................. | 707/610 |
| 2008/0177848 A1 | * | 7/2008 | Wakhlu ........................ | 709/206 |
| 2009/0070346 A1 | * | 3/2009 | Savona et al. ................ | 707/100 |
| 2009/0144334 A1 | | 6/2009 | McAfee | |
| 2010/0070448 A1 | * | 3/2010 | Omoigui ....................... | 706/47 |
| 2010/0161613 A1 | * | 6/2010 | Rao ............................... | 707/741 |
| 2010/0169327 A1 | | 7/2010 | Lindsay et al. | |
| 2010/0293105 A1 | * | 11/2010 | Blinn et al. .................. | 705/319 |
| 2010/0306185 A1 | | 12/2010 | Smith et al. | |
| 2011/0035386 A1 | | 2/2011 | Hsiao et al. | |
| 2011/0040733 A1 | * | 2/2011 | Sercinoglu et al. .......... | 707/688 |
| 2011/0113060 A1 | | 5/2011 | Martini et al. | |

(Continued)

OTHER PUBLICATIONS

Office Action, Canadian Intellectual Property Office, CA Appl. No. 2,764,990, Dec. 2, 2013.

*Primary Examiner* — Melvin H Pollack
(74) *Attorney, Agent, or Firm* — Thomas S. Grzesik; Fleit Gibbons Gutman Bongini & Bianco P.L.

(57) ABSTRACT

The present disclosure provides for prioritization and display of relevant news information for at least one watched contact in order to present only news of interest about a user's contacts to a user. A news information spike analysis of news information associated with a watched contact determines whether the watched contact has experienced a news information spike during a time period. News information associated with a news information spike is retrieved and at least one news information item representative of the news information spike are selected and presented in a user interface.

27 Claims, 7 Drawing Sheets

(56) References Cited

U.S. PATENT DOCUMENTS

| | | |
|---|---|---|
| 2011/0125793 A1 | 5/2011 | Erhart et al. |
| 2011/0202513 A1* | 8/2011 | Singh ............................ 707/706 |
| 2011/0213654 A1* | 9/2011 | Yang ........................... 705/14.43 |
| 2011/0213785 A1 | 9/2011 | Kristiansson et al. |
| 2011/0231407 A1 | 9/2011 | Gupta et al. |
| 2011/0282860 A1* | 11/2011 | Baarman et al. ............... 707/709 |
| 2012/0001919 A1* | 1/2012 | Lumer .......................... 345/440 |
| 2012/0197896 A1* | 8/2012 | Li et al. ......................... 707/740 |
| 2013/0018896 A1* | 1/2013 | Fleischman et al. .......... 707/748 |
| 2013/0097685 A1* | 4/2013 | Kennedy et al. .................. 726/8 |
| 2013/0110932 A1* | 5/2013 | Itani et al. ..................... 709/204 |
| 2013/0117381 A1* | 5/2013 | Garcia et al. .................. 709/206 |

* cited by examiner

PRIORITIZING AND PROVIDING INFORMATION ABOUT USER CONTACTS

BACKGROUND

Personal information manager (PIM) software applications are computer programs that allow a user to maintain and organize various types of personal information and which provide electronic mail (email) functionality. PIM software applications (or simply "PIM applications") typically maintain personal information in distinct information categories. The information categories that are maintained usually include an email message inbox, an email message outbox, a set of previously transmitted email messages or "sent items", an address book containing contact information, a scheduling calendar (or i.e. a set of appointments, notes, and a list of tasks to be completed). PIM applications may be designed for execution by a wireless communication device.

In certain personal information management (PIM) applications, news articles about a user's contacts are provided to the user via a user dashboard user interface. It is often the case that there are many news articles found for a user about their contacts, more than they can reasonably consume.

BRIEF DESCRIPTION OF THE DRAWINGS

Example embodiments of the present disclosure will be described below with reference to the included drawings such that like reference numerals refer to like elements and in which.

DETAILED DESCRIPTION

Figure 1:
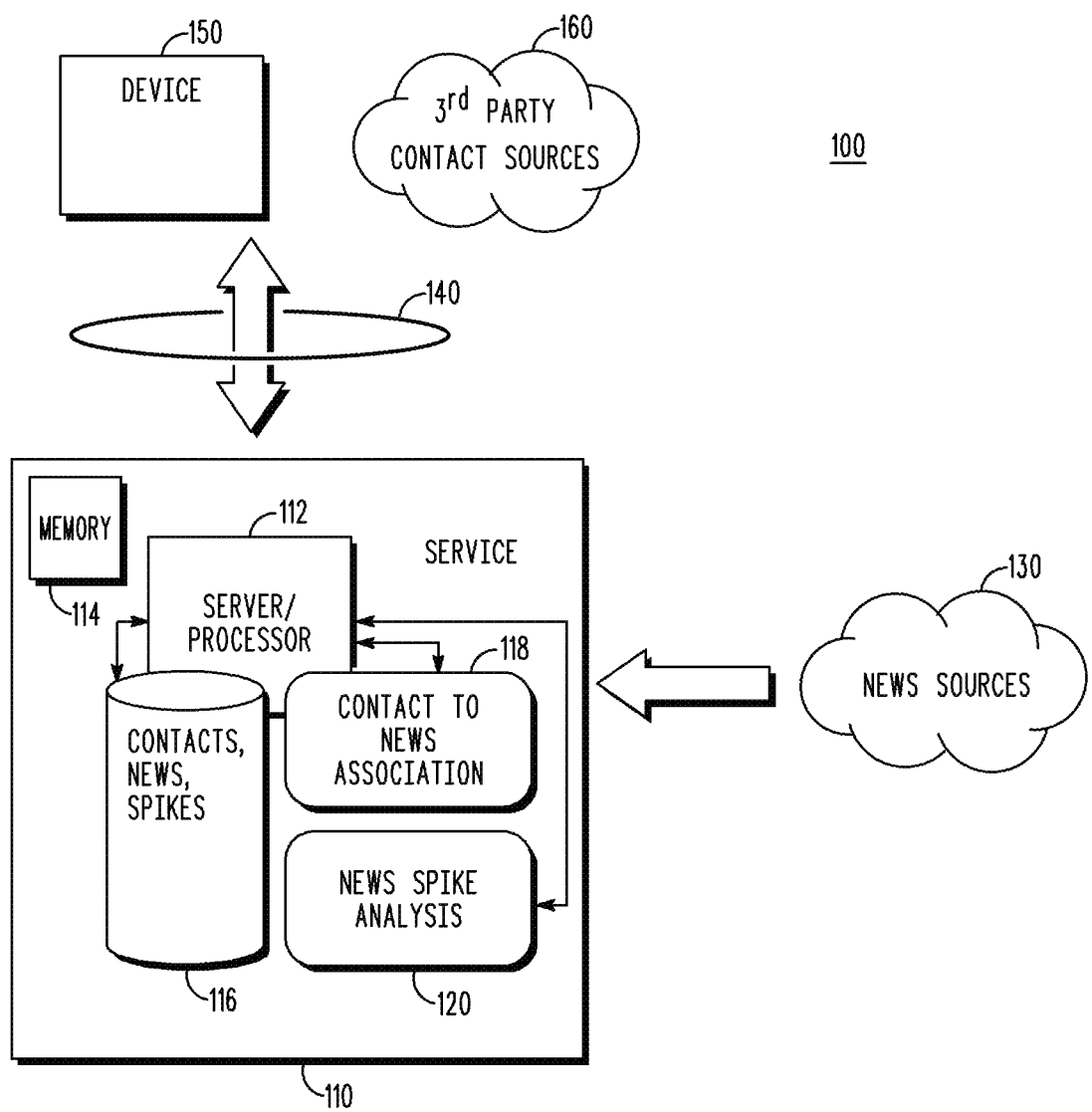
FIG. 1 is a block diagram of a communications system that includes a news information service, a communications network, and various communication devices, in accordance with various example embodiments of the present disclosure.

In accordance with the various example embodiments presented herein, selecting what news information to display for a given user's dashboard or daily email summary is provided. In order to properly prioritize what is shown (i.e. displayed) to a user, it is important to look for news articles that are widely reported on from many different sources, as an indication of significance or news-worthiness. A method that determines a frequency of news information occurring during a given time period that is greater than a frequency threshold indicates a news information spike. Variance in the number of articles written about a specific contact, whether it be a person or an organization, can be flagged as meaningful events. Multiple sources will report meaningful events. In this way, contacts of interest that are noteworthy, i.e. mentioned in blogs or news articles, can be identified and representative news information pushed to the user.

Therefore, in accordance with an example embodiment of the present disclosure, there is provided a method of prioritizing and presenting news information related to contacts, including the following. For a number of contacts, associating news information found within a time period with the contact of the number of contacts to which the news information pertains. For each watched contact, of a set of watched contacts of the number of contacts, performing a news information spike analysis of news information associated with the watched contact during the time period, and determining from the performed news information spike analysis at least one of the watched contacts that has experienced a frequency of news information occurring during the time period that is greater than a frequency threshold value and representative of a news information spike during the time period. For at least one of the watched contacts that has experienced the news information spike, retrieving news information associated with the watched contact and selecting at least one news information item representative of the news information spike associated with the watched contact during the time period. Provide the at least one news information item representative of the news information spike. Present in a user interface the at least one news information item representative of the news information spike.

In accordance with another example embodiment of the present disclosure, there is provided a system having a processor and a contacts and news information database coupled to the processor in which a number of contacts and news information about the number of contacts are stored, the processor and contacts and news information database configured as follows. For a number of contacts, associating news information found within a time period with the contact of the number of contacts to which the news information pertains. For each watched contact, of a set of watched contacts of the number of contacts, perform an news information spike analysis for the watched contact of news information associated with the watched contact during the time period, and determine from the performed news information spike analysis at least one of watched contacts that has experienced a frequency of news information occurring during the time period that is greater than a frequency threshold value and representative of a news information spike during the time period. For at least one of the watched contacts that has experienced the news information spike, retrieve news information associated with the watched contact, and select at least one news information item representative of the news information spike associated with the watched contact during the time period. Provide the at least one news information item representative of the news information spike. Present in a user interface the at least one news information item representative of the news information spike.

In accordance with a further example embodiment of the present disclosure, there is provided a non-transitory computer-readable medium having computer-executable instructions for causing a server having a processor and associated memory to implement the following. For a plurality of contacts, associating news information found within a time period with a contact of the plurality of contacts to which the news information pertains. For each watched contact, of a set of watched contacts of the plurality of contacts, performing a news information spike analysis of news information associated with the watched contact during the time period, and determining from the performed news information spike analysis at least one of the watched contacts that has experienced a frequency of news information occurring during the time period that is greater than a frequency threshold value and representative of a news information spike during the time period. For at least one of the watched contacts that has experienced the news information spike, retrieving news information associated with the watched contact, and selecting at least one news information item representative of the news information spike associated with the watched contact during the time period. Provide the at least one news information item representative of the news information spike. Present in a user interface the at least one news information item representative of the news information spike.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

Referring now to FIG. 1, a block diagram of a distributed communications system 100 that includes a service 110 that may be provided with news information about various contacts from news sources 130, a communications network 140 by which the service 110 may communicate with a communication device 150, and third party contact sources 160 that may provide information about contacts to the communication device 150 and/or the service 110. Although communications network 140 may be the World Wide Web or Internet, and in fact search various servers 112 associated with service 110 may reside on the World Wide Web, it is understood that the service servers and one or more communication devices 150 may be coupled together by various types of networks, such as local area networks (LANs), other wide area networks (WANs) and regional networks accessed over telephone lines, such as commercial information services. In an example embodiment, service 110 may be included in the communication device 150.

Communication device 150 is a two-way electronic communication device having at least data and possibly also voice communication capabilities, and the capability to communicate with other communication devices or computer systems, for example, via the Internet. A communication device 150 may further be a mobile or handheld electronic device and may be wireless. Depending on the functionality provided by the electronic communication device, in the various examples described herein, the device may be a data communication device, a multiple-mode communication device configured for both data and voice communication, a smartphone, a mobile telephone or a personal digital assistant PDA (personal digital assistant) enabled for wireless communication, or a computer system with a wireless modem. Other examples of mobile electronic devices include mobile, or handheld, wireless communication devices such as pagers, cellular phones, cellular smart-phones, wireless organizers, wirelessly enabled notebook computers, tablet computing devices, and so forth. A mobile electronic device may also be a portable electronic device without wireless communication capabilities, such as a handheld electronic game device, digital photograph album, digital camera, or other device.

Service 110 may include one or more servers or processors 112, a memory 114, a contacts database, a news information database, and a news information spike analysis database (the databases are collectively 116), a contact-to-news association element 118 and a news spike analysis element 120, as shown. The service 110 may be provided by a data center, for example, that uses a large number of servers/processors 112 in racks. Server 112 of service 110 may have a number of different servers, with each server having one or more processors, databases 116, and memories 114. The server 112 may be by way of example, and not limitation, a Network Operations Center (NOC), such as a Blackberry Enterprise Server (BES), or other central server arrangement that can combine many social networks and manage them collectively. Load balancing between various servers 112 may be employed in example configurations.

While database 116 encompasses the functionality of a contacts database, a news information database, and a news information spike analysis database, it is understood that such databases may reside within one or many databases to which the service 110 has access. A contacts database stores contacts for which the service associates news information available on the Internet. The contacts stored in the contacts database may be acquired from a communication device 150 directly (for example, from a PIM application executing on the communication device), from a third party contact source 160, such as social network sites that have a vast amount of contact information, or from a user of the communication device 150 electing to provide certain of the user's contacts stored on the device for purposes of associating available news information with the contacts. The service 110 can acquire the contacts and store them in the contacts database. As will be discussed, the user of the communication device 150 may be presented with an option by choosing a subset of watched contacts of the user's contacts for which a news spike analysis may be performed to determine whether there is an occurrence of a news spike event. The news information database represents the news articles found by the service during a given time period or periods, and the news information spike analysis database stores the results of a news information spike analysis conducted by one or more servers/processors 112 of the service.

In keeping with various examples, service 110 can acquire contacts from a user's communication device 150 and/or various third party contact sources 160. The service 110 associates news information with a user's contacts. The news information may be published content on the World Wide Web or Internet, such as might be obtained from blogs or main stream news sources, such as local stations or a syndicated news service, such as Reuters, etc. User contacts may be obtained directly from the communication device 150 itself. Contact information may also be obtained from a variety of sources on the Internet, including but not limited to GMAIL, Google contacts, social network contacts (such as Facebook, Twitter, Linked-In, etc.). The service 110 can associate news information for a given time period with a contact to which the news information pertains. This contact-to-news association is performed by contact-to-news association element 118 of the service. For a set of watched contacts. a news information spike analysis of news information associated with at least one of the watched contacts can be performed; news spike analysis element 120 of service 110 performs this function. From the performed news information spike analysis, it can be determined which watched contact(s) of the set of watched contacts has experienced a frequency of news information during a time period greater than a frequency threshold value that is representative of a news information spike occurring during the time period. It is noted that the service can select the set of watched contacts or a user of the communication device can select the set.

When it has been determined that at least one news information spike of at least one of the watched contacts has occurred during the period of time, the server/processor 112 of service 110 can retrieve news information associated with the watched contact and select at least one news information item representative of the news information spike associated with the watched contact during the time period. The selected news information items representative of the news information spike of a watched contact can then be presented in a user interface. The server/processor 112 in cooperation with the memory 114, database 116, contact-to-news association element 118 and news spike analysis element 120 coordinates this method.

The user can decide whether to opt-in to the service provided by service 110 or it may be provided automatically. A PIM application that executes on the communication device 150 may prompt the user to decide whether to opt-in, or this may occur after the news spike analysis performed by the service 110 has identified at least one of the watched contacts that has experienced a news information spike and transmitted representative news information items of the news information spike of the at least one watched contact to the PIM application via communication network 140.

This method is further illustrated in the flows of FIGS. 3 and 4 of the drawings, described below.

Figure 2:
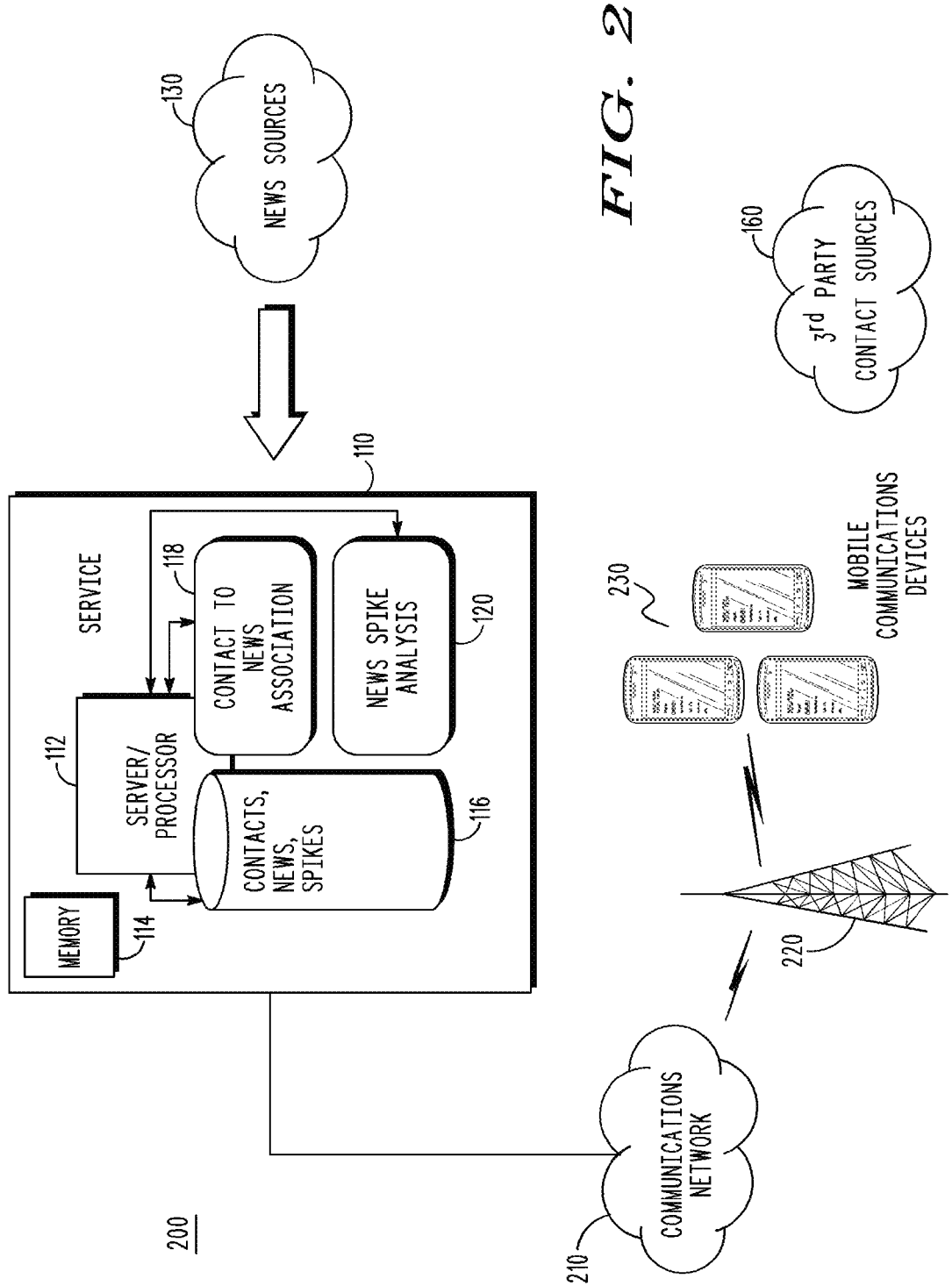
FIG. 2 is a block diagram of a wireless communication system, in accordance with various example embodiments of the present disclosure.

In system 200 of FIG. 2, an example of a wireless communications network is shown. The service 110 is as shown in FIG. 1, but the communications network 220 is shown as a mobile carrier network in communication with one or more mobile or wireless communication devices 230, which can communicate wirelessly with carrier network 220 via one or more base station towers. In this example, the wireless communication devices 230 can be wireless handheld devices.

Figure 3:
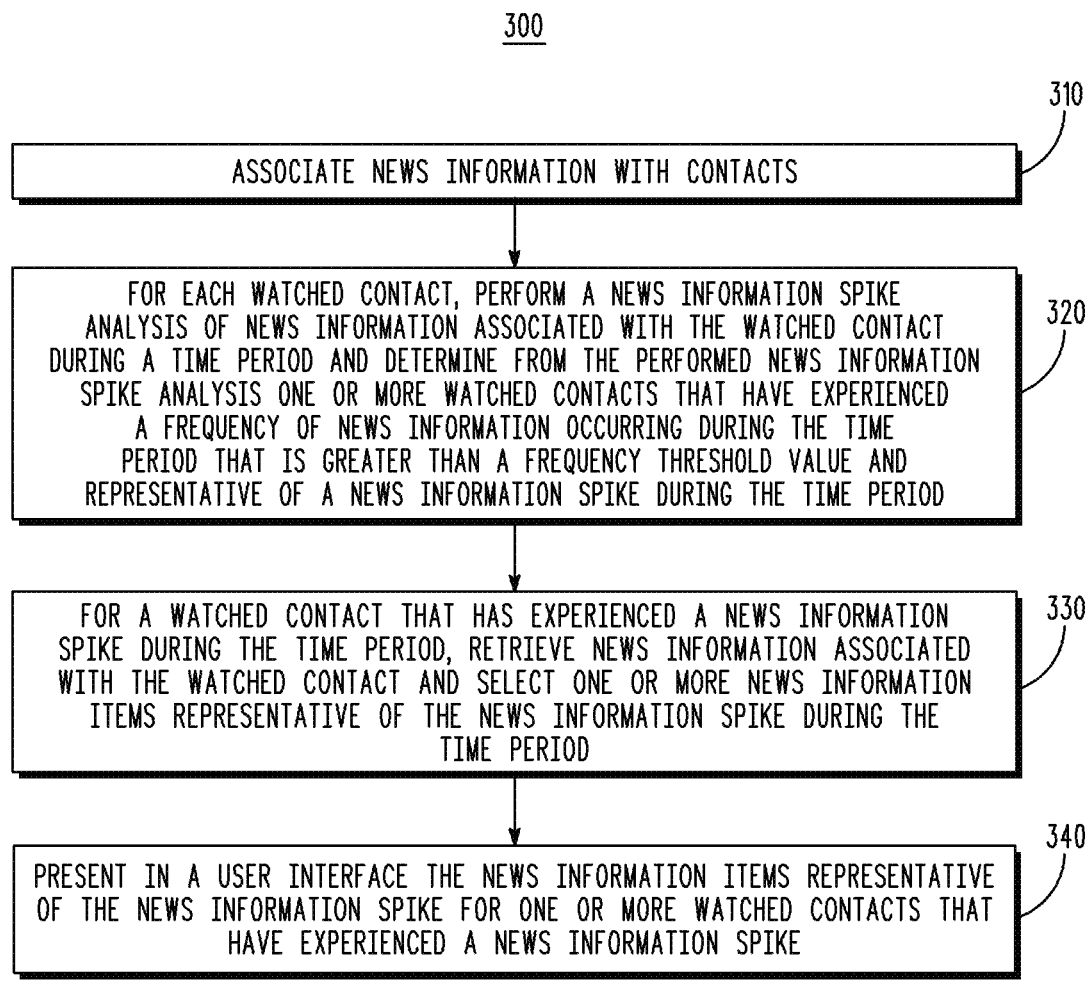
FIG. 3 is a flowchart of a method for presenting news information of watched contacts, in accordance with various example embodiments of the present disclosure.
Figure 4:
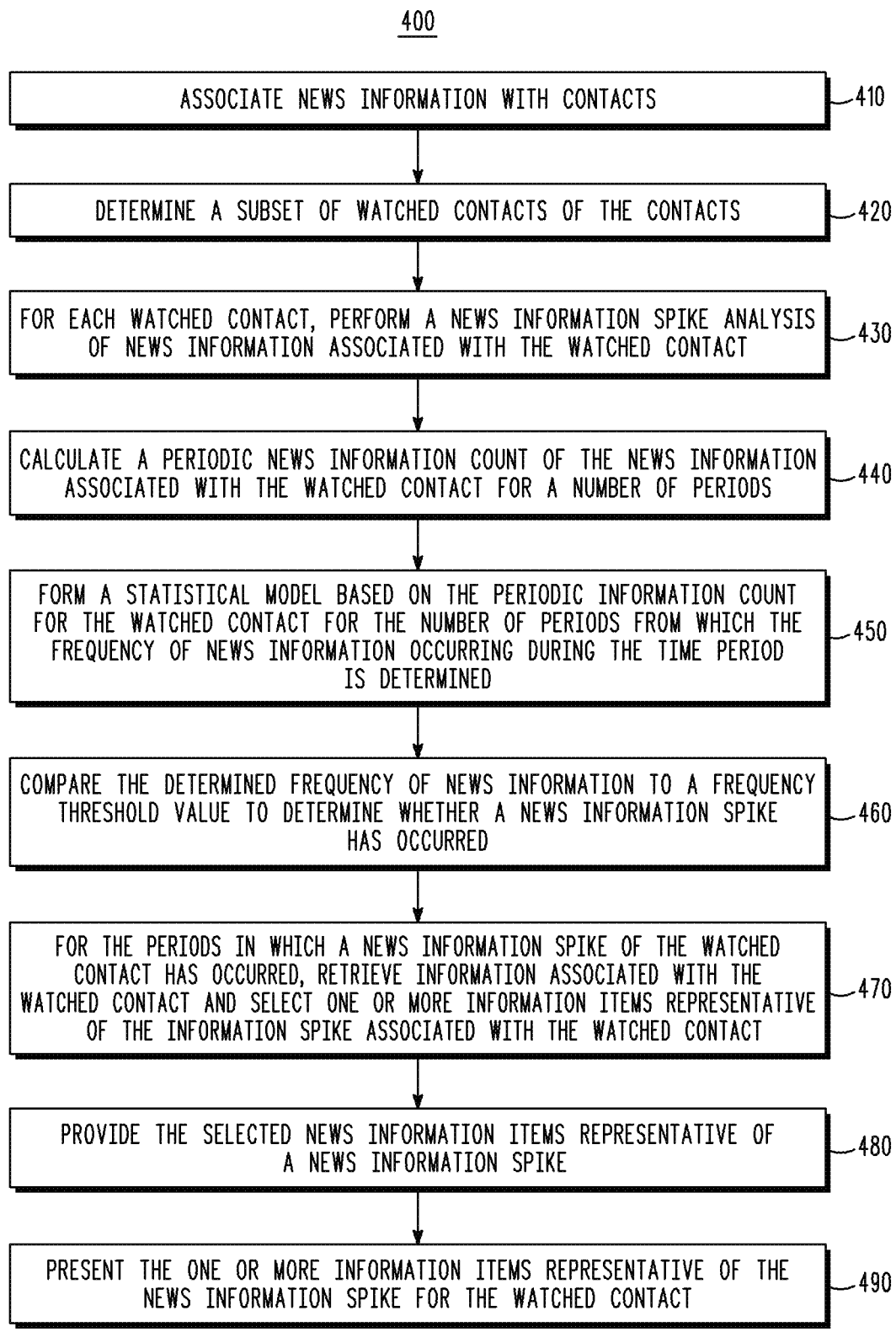
FIG. 4 is a flowchart of a method for presenting news information of watched contacts, in accordance with various other example embodiments of the present disclosure.

Referring now to FIGS. 3 and 4, methodology flows in accordance with various examples given herein are provided. In flow 300 of FIG. 3, at Block 310 the service associates news information found within a given time period with the relevant contact to which the news information is related. The association may be accomplished by attaching a pointer from the news information to the contact to which the news information relates to pair the news information with the contact. Again, the association is performed by contact-to-news association element 118 of service 110. The service 110 can acquire contacts from a variety of sources, as discussed previously, whether it be from the user communication device 150 or a third party contact source 160. A method implemented by the service can run in the background with a list of contacts and a list of news articles, which can be paired up as news articles come in, by attaching a pointer to the contacts.

Next, at Block 320, for each watched contact, the service performs a news information spike analysis of news information associated with the watched contact during the time period and determines from the performed news information spike analysis at least one of the watched contacts that has experienced a frequency of news information occurring during the time period that is greater than a frequency threshold value and representative of a news information spike during the time period. The service may select the set of "watched" contacts of a user's contacts or the user may make this selection.

A user visit to a contact's dashboard or the sending of an update email requesting updated information, may cause the service to examine news articles that are matched to a watched contact of interest. If the contact or article is spiking, meaning that it is experiencing a news information spike within a given defined period of time, it will be prioritized. Spiking refers to the frequency, or the number of daily articles, as an example, that are matched to the contact. The number of articles matched today to a particular watched entity can be counted, and compared to the history for this particular watched contact to understand if it is important. An unusually high number of news articles about a given watched contact, will indicate a news information spike for that watched contact.

Performing the news information spike analysis of news information associated with the watched contact of Block 320 may include calculating a periodic news information count of the news information associated with the watched contact for a number of periods; forming a statistical model based on the periodic news information count for the watched contact for the periods from which the frequency of news information occurring during the time period is determined; and comparing the determined frequency of news information to the frequency threshold value to determine whether a news information spike has occurred. In some examples, from the statistical model a mean count for the watched contact for the number of periods is determined and each period in which the period news information count for the watched contact is greater than the means count is identified as having a news information spike for the watched contact. Or, a weighted average for the watched contact of news information can be determined from the statistical model and each period in which the periodic news information count for the watched contact is greater than the weighted average for the watched contact is identified as having a news information spike for the watched contact. A Gaussian distribution of news articles may be assumed.

At Block 330, for a watched contact that has experienced a news information spike during the time period, news information associated with the watched contact can be retrieved and at least one news information item representative of the news information spike for the watched contact can be selected. These selected, representative news information items, such as a representative news article, for at least one of the watched contacts that has experienced new information spikes can then be presented in a user interface at Block 340.

Presenting news information items representative of a news information spike can include displaying on a display the news information items representative of the news information spike for a watched contact. This may include a personal management information (PIM) application displaying the news information items in a user's dashboard graphical interface of the PIM application. This may further include displaying news information items in an email summary message or in a user's dashboard graphical interface of a device or a browser. Moreover, an update message, such as an update email, with at least one news information item representative of a news information spike may be sent. The service may transmit the update message to a communication device for display by the communication device. A PIM application may receive and then display this update message in a user's dashboard graphical interface of the PIM application.

Further to just presenting news information items, a subject of a news information spike can be identified and presented as well as the subject of the news information spike, as discussed below. This may be accomplished by clustering news information associated with a watched contact to identify the subject of the news information spike and a representative news information item, such as a representative news article, for the news information spike. Clustering as used herein is a machine learning term that may encompass K-Mean algorithm on news article titles, for example, factor analysis, or term frequency.

Because the amount of information presented about a user's contacts can be so vast, the at least one news information item representative of a news information spike for a watched contact can be prioritized over that of other news information presented about other contacts. Thus, news information items that have been prioritized can be presented first, more prominently, etc. over other news information presented to a user, as discussed further below.

Referring now to flow 400 of FIG. 4, at Block 410 news information is associated with relevant contacts, as discussed above. Block 410 may be implemented by processor 112 and/or contact-to-news association element 118 of FIG. 1 and FIG. 2. Blocks 420-480 may be implemented by processor 112 and/or news spike analysis element 120. At Block 420, a set or subset of the contacts for which news information has been associated by service 110 can be identified. The set of "watched" contacts can be automatically determined by the service, perhaps as a function of those contacts experiencing the most news on the Internet, or it may be determined by a user of the user communication device 150. For each watched contact, a news information spike analysis of news information associated with each of the watched contacts is performed at Block 430. At Block 440 a periodic news information count of news information associated with each of the watched contacts for a number of periods is calculated. For example, the period may be one day (24 hours).

At Block 450, a statistical model based on the periodic news information count for each of the watched contacts for the number of periods from which the frequency of news information occurring during the time period is determined. The determined frequency of news information is compared to a frequency threshold value to determine whether a news information spike has occurred for a watched contact at Block 460.

In some examples, from the statistical model a mean count for the watched contact for the number of periods is determined and each period in which the period news information count for the watched contact is greater than the means count is identified as a news information spike for the watched contact. Or, a weighted average for the watched contact of news information can be determined from the statistical model and each period in which the periodic news information count for the watched contact is greater than the weighted average for the watched contact is identified as a news information spike for the watched contact For each of the periods in which a news information spike of a watched contact has occurred, information associated with the watched contacts is retrieved from the database 116 and at least one news information item representative of the information spike is selected at Block 470. The selected new information items representative of a news information spike are provided at Block 480. This selected new information may be transmitted from service 110 to communication device 150 of FIG. 1 or to one of the communication devices 230 of FIG. 2. The selected news information items representative of a news information spike is presented in a user interface at Block 490. Block 490 may be implemented by communications device 150 of FIG. 1 or one of the communication devices 230 of FIG. 2.

While the blocks including the methods are shown as occurring in a particular order, it will be appreciated by those skilled in the art that many of the blocks are interchangeable and can occur in different orders than that shown without materially affecting the end results of the methods.

Figure 5:
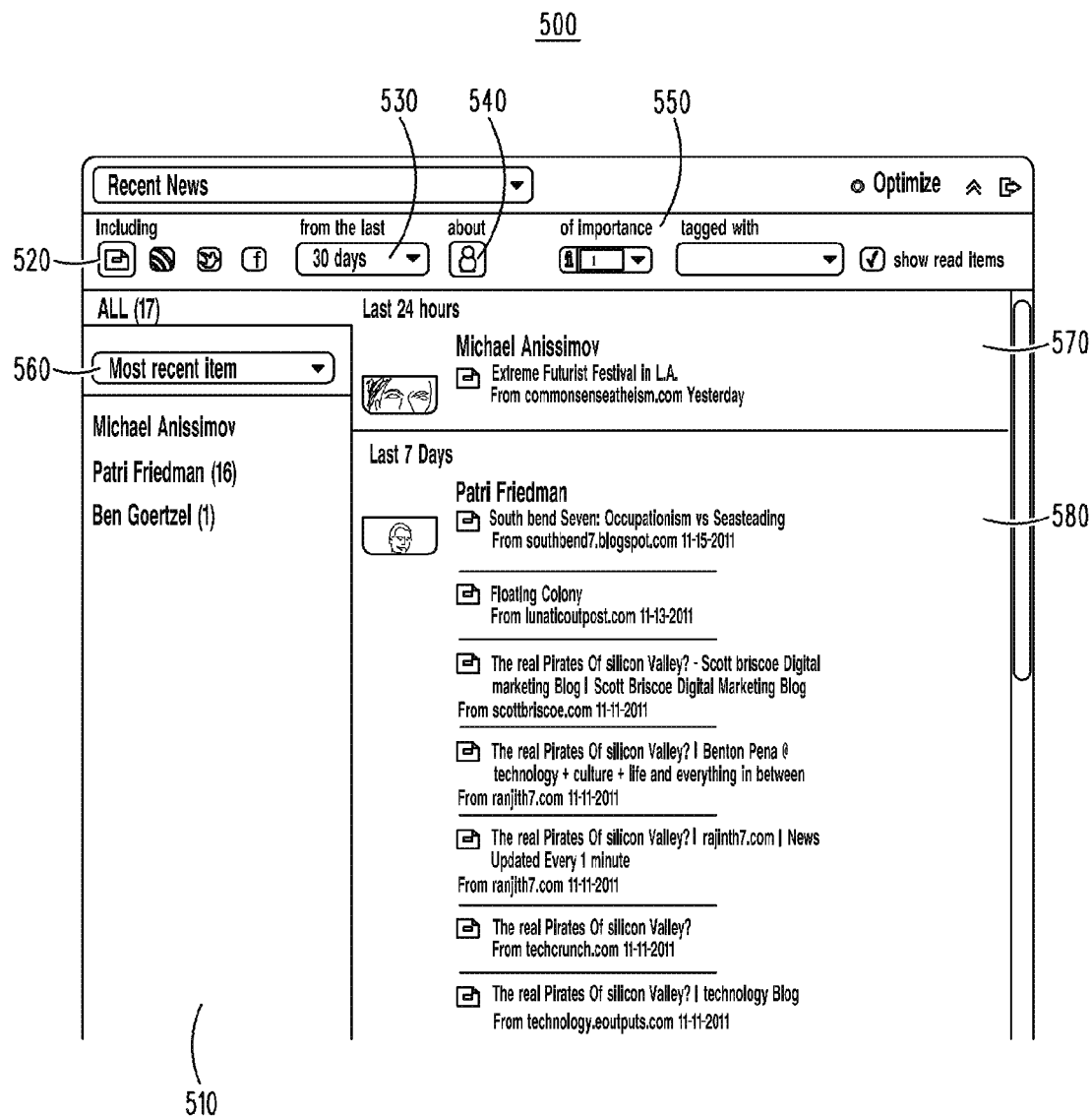
FIGS. 5 and 6 illustrate representative examples of a user dashboard graphical user interface, in accordance with various example embodiments of the present disclosure.
Figure 6:
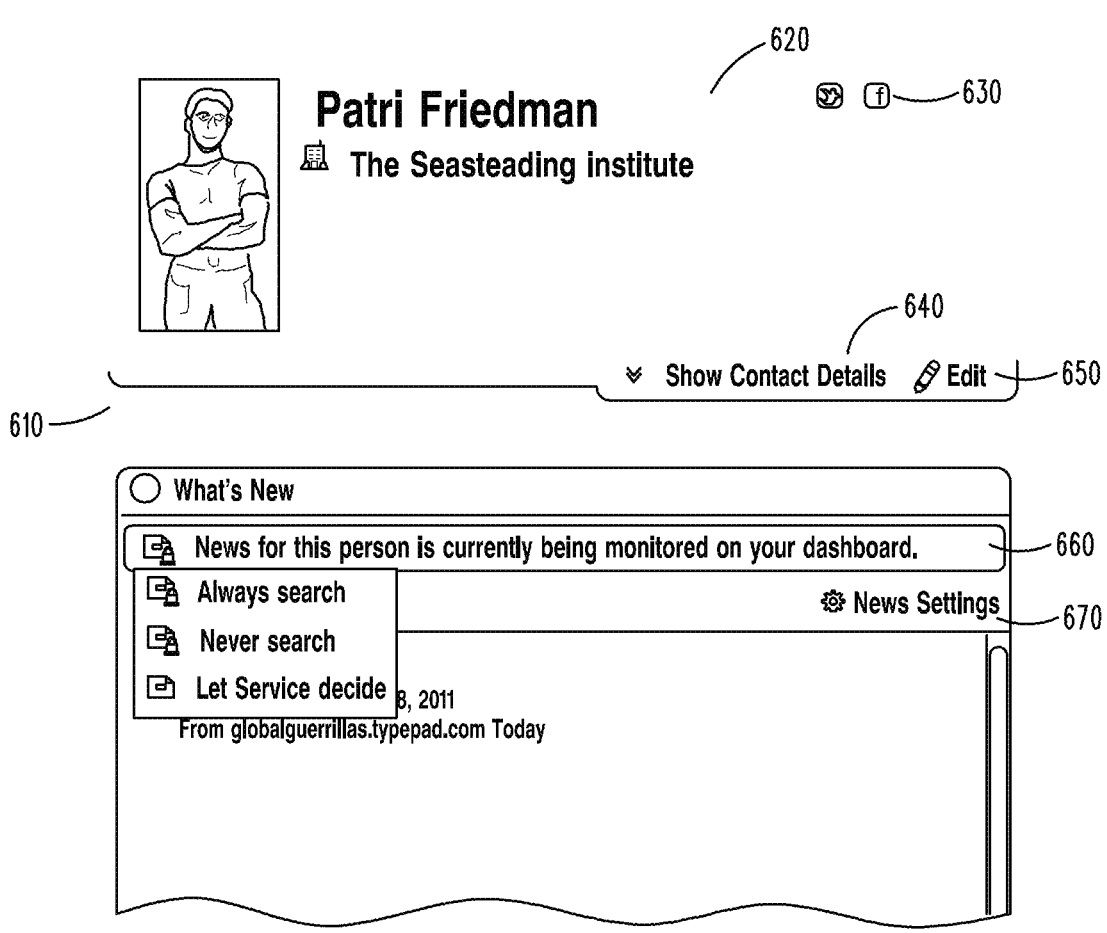

Referring now to FIGS. 5 and 6, examples of a user's dashboard graphical user interface are provided. The user's dashboard graphical user interface may be implemented in a display of communications device 150 of FIG. 1 or one of the communication devices 230 of FIG. 2. In the dashboard graphical user interface 500 of FIG. 5, dashboard view 510 shows presentation of information about a contact that has experienced a news spike. The source of contacts is provided by icon 520, which may include the user's contacts database, Facebook, etc. Field 530 of the dashboard indicates that the periods analyzed is every 24 hours and that a database of 30 days have been saved in the service's analysis database 116. The contact of interest is shown in field 540 and the importance of the information is indicated in field 550. The contacts are sorted in accordance with pull-down field 560; in this example, the most recent contact item is displayed first and so contact Michael Anissimov is listed first, followed by Patri Friedman, and then Ben Gertzel. In field 570, the most recent news item is associated with Michael Anissimov and is entitled, "Extreme Futurist Festival in L.A." Below that, in field 580, representative news items of Patri Friedman over several days are listed. In this example, contact Patri Friedman has experienced a news spike and the news articles listed are news information items representative of the news spike. It can be seen that Patri Friedman has 16 associated news articles over the last 30 days from different news sources. The subject of the news spike is pirating. A representative, recent news article entitled "South Bend Seven: Occupationism vs Seasteading" dated Nov. 15, 2011 is shown. It can be seen that the number of news articles of this watched contact have been prioritized and at least one news information items presented in accordance with that prioritization in a user interface of a dashboard. Determination of this contact as having a news spike may occur, for example, if the number of 16 news articles exceeds a mean, weighted average, etc. determined for the contact, as noted above.

Referring to dashboard graphical user interface 600 of FIG. 6, a screen cap of dashboard view 610 shows a mechanism that allows the user to select which contacts appear on the dashboard and are included in news spike analysis. This screen cap of the dashboard view is for Patri Friedman in field 620 and field 630 indicates that this contact is to be found in various social network contact databases. Selection of tab 640 in the dashboard allows details of the selected contact to be shown, while selection of edit tab 650 allows a user to edit the contact, as shown here. Field 660 indicates that "news for this person is currently being monitored on your Dashboard." For news setting tab 670, there are three options presented to the user: Always search, Never search, Let service decide. This feature of the dashboard graphical user interface allows the user to opt-in or opt-out of deciding whether to select contacts to be part of the "watched" set of contacts.

Figure 7:
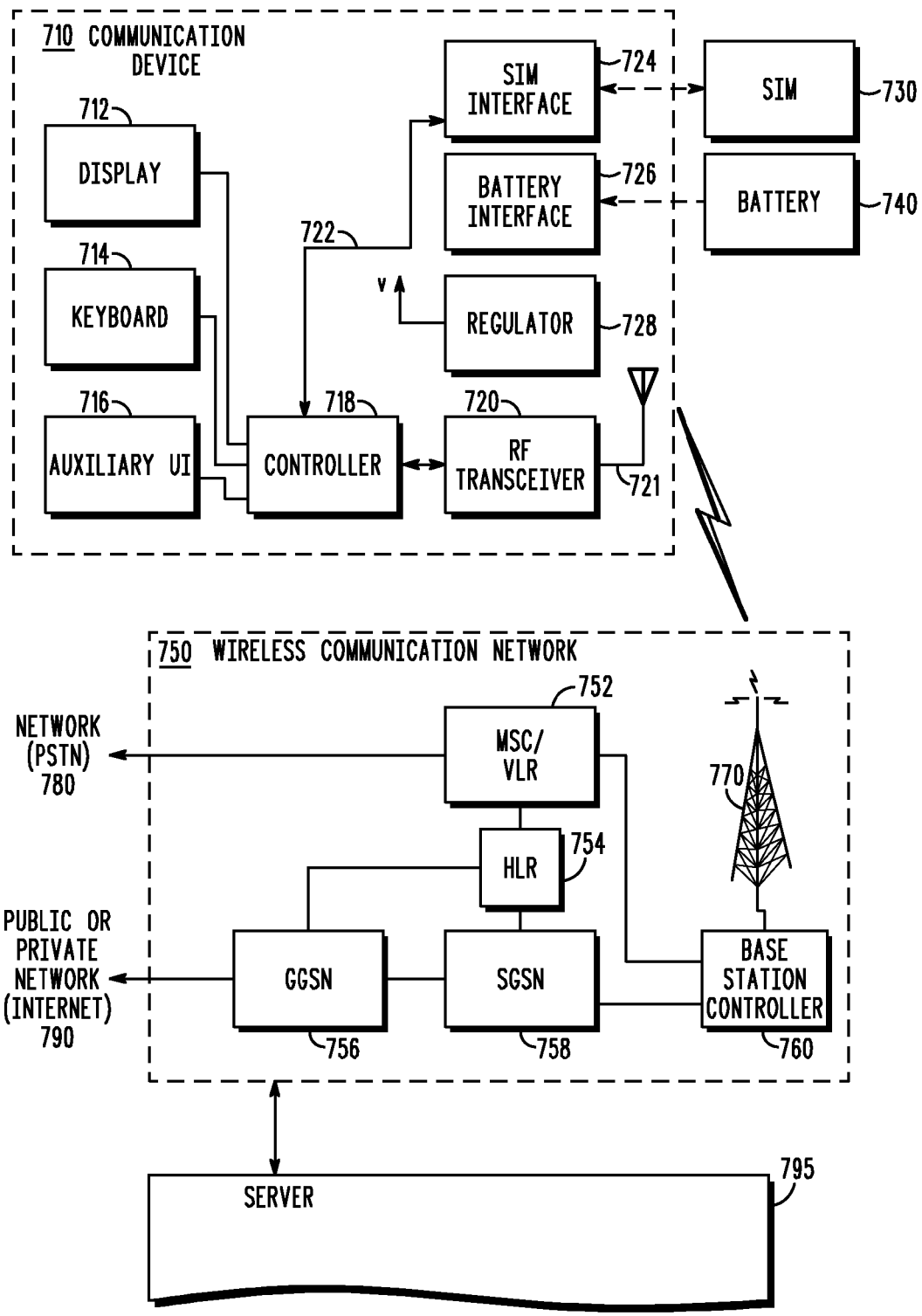
FIG. 7 is a block diagram of a wireless communication system 200, in accordance with various example embodiments of the present disclosure.

To illustrate example system architecture, FIG. 7 shows a block diagram of a wireless communication system 700 which includes an electronic communication device 710, such as a wireless or mobile communication device, which communicates through a wireless communication network 750, to a server 795. An example wireless implementation of electronic communication device 710 and a wireless communication network 750 with which it communicates will now be discussed. Communication device 710 has a visual display 712, a keyboard 714, and perhaps one or more auxiliary user interfaces (UI) 716, each of which are coupled to a controller 718. Controller 718 is also coupled to radio frequency (RF) transceiver circuitry 720 and an antenna 721. Controller 718 may be embodied as a central processing unit (CPU) which runs operating system software in a memory component (not shown). Controller 718 will normally control overall operation of electronic communication device 710, whereas signal processing operations associated with communication functions may be performed in RF transceiver circuitry 720. Controller 718 interfaces with device display 712 to display received information, stored information, user inputs, and the like. Keyboard 714, which may be a telephone type keypad or full alphanumeric keyboard, is normally provided for entering data for storage in electronic communication device 710, information for transmission to network 750, a telephone number to place a telephone call, commands to be executed on electronic communication device 710, and possibly other or different user inputs.

Electronic communication device 710 sends communication signals to and receives communication signals from network 750 over a wireless link via antenna 721. RF transceiver circuitry 720 performs functions similar to those of a tower station 770 and a base station controller (BSC) 760, including for example modulation/demodulation and possibly encoding/decoding and encryption/decryption. It is also contemplated that RF transceiver circuitry 720 may perform certain functions in addition to those performed by BSC 760. It will be apparent to those skilled in art that RF transceiver circuitry 720 will be adapted to particular wireless network or networks in which electronic communication device 710 is intended to operate. When electronic communication device 710 is fully operational, an RF transmitter of RF transceiver circuitry 720 is typically keyed or turned on only when it is sending to network, and is otherwise turned off to conserve resources. Similarly, an RF receiver of RF transceiver circuitry 720 is typically periodically turned off to conserve power until it is needed to receive signals or information (if at all) during designated time periods.

Electronic communication device 710 includes a battery interface 726 for receiving one or more rechargeable batteries 740. Battery 740 electrical power to electrical circuitry in electronic communication device 710, and battery interface 726 provides for a mechanical and electrical connection for battery 740. Battery interface 726 is coupled to a regulator 728 which regulates power to the device. Electronic communication device 710 may be a handheld portable communication device, which includes a housing (e.g. a plastic housing) which carries and contains the electrical components of electronic communication device 710 including battery 740. Electronic communication device 710 operates using a Subscriber Identity Module (SIM) 730 which is connected to or inserted in electronic communication device 710 at a SIM interface 724. SIM 730 is one type of a conventional "smart card" used to identify an end user (or subscriber) of electronic communication device 710 and to personalize the device, among other things. Without SIM 730, the communication device terminal is not fully operational for communication through wireless network 750. By inserting SIM 730 into electronic communication device 710, an end user can have access to any and all of his/her subscribed services. SIM 730 generally includes a processor and memory for storing information. Since SIM 730 is coupled to SIM interface 724, it is coupled to controller 718 through communication lines 722. In order to identify the subscriber, SIM 730 contains some user parameters such as an International Mobile Subscriber Identity (IMSI). An advantage of using SIM 730 is that end users are not necessarily bound by any single physical mobile communication device. SIM 730 may store additional user information for the communication device 710 as well, including datebook (or calendar) information and recent call information.

Electronic communication device 710 may consist of a single unit, such as a data communication device, a cellular telephone, a multiple-function communication device with data and voice communication capabilities, a personal digital assistant (PDA) enabled for wireless communication, or a computer incorporating an internal modem. Electronic communication device 710 may be a handheld portable communication device which includes a housing (e.g. a plastic housing) which carries and contains the electrical components of electronic communication device 710. Alternatively, electronic communication device 710 may be a multiple-module unit including a plurality of separate components, including but in no way limited to a computer or other device connected to a wireless modem. In particular, for example, RF transceiver circuitry 720 and antenna 721 may be implemented as a radio modem unit that may be inserted into a port on a laptop computer. In this case, the laptop computer would include display 712, keyboard 714, one or more auxiliary UIs 716, and controller 718 embodied as the computer's CPU. It is also contemplated that a computer or other equipment not normally capable of wireless communication may be adapted to connect to and effectively assume control of RF transceiver circuitry 720 and antenna 721 of a single-unit device such as one of those described above.

Electronic communication device 710 communicates in and through wireless communication network 750. Wireless communication network 750 may be a cellular telecommunications network. In an example embodiment, wireless network 750 is configured in accordance with General Packet Radio Service (GPRS) and a Global Systems for Mobile (GSM) technologies. Today, such a mobile communication device may further operate in accordance with Enhanced Data rates for GSM Evolution (EDGE) or Enhanced GPRS (EGPRS), as described in the Background section. In such environment, wireless network 750 includes a base station controller (BSC) 760 with an associated tower station 770, a Mobile Switching Center (MSC) 752, a Home Location Register (HLR) 754, a Serving General Packet Radio Service (GPRS) Support Node (SGSN) 758, and a Gateway GPRS Support Node (GGSN) 756. MSC 752 is coupled to BSC 760 and to a landline network, such as a Public Switched Telephone Network (PSTN) 780. SGSN 758 is coupled to BSC 760 and to GGSN 756, which is in turn coupled to a public or private data network 790 (such as the Internet). HLR 754 is coupled to MSC 752, SGSN 758, and GGSN 756.

Station 770 is a fixed transceiver station, and station 770 and BSC 760 may be referred to as transceiver equipment. The transceiver equipment provides wireless network coverage for a particular coverage area commonly referred to as a "cell". The transceiver equipment transmits communication signals to and receives communication signals from mobile communication devices within its cell via station 770. The transceiver equipment normally performs such functions as modulation and possibly encoding and encryption of signals to be transmitted to the mobile communication device in accordance with particular, usually predetermined, communication protocols and parameters, under control of its controller. The transceiver equipment similarly demodulates and possibly decodes and decrypts, if necessary, any communication signals received from electronic communication device 710 within its cell. Communication protocols and parameters may vary between different networks. For example, one network may employ a different modulation scheme and operate at different frequencies than other networks.

The wireless link shown in communication system 700 of FIG. 7 represents one or more different channels, typically different radio frequency (RF) channels, and associated protocols used between wireless network 750 and electronic communication device 710. An RF channel is a limited resource to be conserved, due to limits in overall bandwidth and a limited battery power of electronic communication device 710. Those skilled in art will appreciate that a wireless network in actual practice may include hundreds of cells, each served by a station 770 (i.e. or station sector), depending upon desired overall expanse of network coverage. All pertinent components may be connected by multiple switches and routers (not shown), controlled by multiple network controllers.

For all electronic communication devices 710 registered with a network operator, permanent data (such as electronic communication device 710 user's profile) as well as temporary data (such as electronic communication device's 710 current location) are stored in HLR 754. In case of a voice call to electronic communication device 710, HLR 754 is queried to determine the current location of electronic communication device 710. A Visitor Location Register (VLR) of MSC 752 is responsible for a group of location areas and stores the data of those mobile electronic communication devices that are currently in its area of responsibility. This includes parts of the permanent communication device data that have been transmitted from HLR 754 to the VLR for faster access. However, the VLR of MSC 752 may also assign and store local data, such as temporary identifications. Optionally, the VLR of MSC 752 can be enhanced for more efficient co-ordination of GPRS and non-GPRS services and functionality (e.g. paging for circuit-switched calls which can be performed more efficiently via SGSN 758, and combined GPRS and non-GPRS location updates).

Serving GPRS Support Node (SGSN) 758 is at the same hierarchical level as MSC 752 and keeps track of the individual locations of communication devices. SGSN 758 also performs security functions and access control. Gateway GPRS Support Node (GGSN) 756 provides interworking with external packet-switched networks and is connected with SGSNs (such as SGSN 758) via an IP-based GPRS backbone network. SGSN 758 performs authentication and cipher setting procedures based on algorithms, keys, and criteria (e.g. as in existing GSM). In conventional operation, cell selection may be performed autonomously by electronic communication device 710 or by the transceiver equipment instructing electronic communication device 710 to select a particular cell. Electronic communication device 710 informs wireless network 750 when it reselects another cell or group of cells, known as a routing area.

In order to access GPRS services, electronic communication device 710 first makes its presence known to wireless network 750 by performing what is known as a GPRS "attach". This operation establishes a logical link between electronic communication device 710 and SGSN 758 and makes electronic communication device 710 available to receive, for example, pages via SGSN, notifications of incoming GPRS data, or SMS messages over GPRS. In order to send and receive GPRS data, electronic communication device 710 assists in activating the packet data address that it wants to use. This operation makes electronic communication device 710 known to GGSN 756; interworking with external data networks can thereafter commence. User data may be transferred transparently between electronic communication device 710 and the external data networks using, for example, encapsulation and tunneling. Data packets are equipped with GPRS-specific protocol information and transferred between electronic communication device 710 and GGSN 756.

From the above description, it can be seen that a service, coupled to a communications network, can prioritize and present news information related to watched contacts. A contacts and news information database, coupled together and in cooperative arrangement, are configured to implement the following. For a number of contacts, associating news information found within a time period with a contact to which the news information pertains. For each watched contact of a set of watched contacts of the number of contacts, perform an news information spike analysis of news information associated with the watched contact and determine from the performed news information spike analysis at least one of the watched contacts that has experienced a frequency of news information occurring during the time period that is greater than a frequency threshold value and representative of a news information spike during the time period. For at least one of the watched contacts that has experienced the news information spike during the time period, retrieve news information associated with the watched contact and select at least one news information item representative of the news information spike associated with the watched contact during the time period. Provide the at least one news information item representative of the news information spike. Present in a user interface the at least one news information item representative of the news information spike.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of prioritizing and presenting news information related to contacts, comprising:
for a plurality of contacts associated with a user of an electronic device, associating news information found within a time period with the contact of the plurality of contacts to which the news information pertains;

for each watched contact, of a set of watched contacts of the plurality of contacts, performing a news information spike analysis of news information associated with the watched contact and determining from the performed news information spike analysis at least one of the watched contacts that has experienced a frequency of news information occurring during the time period that is greater than a frequency threshold value and representative of a news information spike during the time period;

for at least one of the watched contacts that has experienced the news information spike,
 retrieving a plurality of news information items from the news information associated with the watched contact, the plurality of news items comprising news items from different news sources,
 identifying at least one subject of the news information spike, and
 selecting at least one news information item from the plurality of news items representative of the at least one subject of the news information spike; and
providing the at least one news information item representative of the news information spike to the user via the electronic device.

2. The method of claim 1, further comprising
prioritizing the at least one news information item over news information presented about other contacts of the plurality of contacts; and
presenting the at least one news information item in accordance with the prioritizing.

3. The method of claim 1, wherein performing the news information spike analysis of news information associated with the watched contact further comprises:
 calculating a periodic news information count of the news information associated with the watched contact for a plurality of periods;
 forming a statistical model based on the periodic news information count for the watched contact for the plurality of periods from which the frequency of news information occurring during the time period is determined; and
 comparing the determined frequency of news information to the frequency threshold value to determine whether a news information spike has occurred,
wherein the frequency threshold value is determined from the statistical model.

4. The method of claim 3, further comprising:
 determining from the statistical model a mean count for the watched contact for the plurality of periods; and
 identifying as a news information spike each period in which the periodic news information count for the watched contact is greater than the mean count for the watched contact for the plurality of periods.

5. The method of claim 3, further comprising:
 determining from the statistical model a weighted average for the watched contact for the plurality of periods; and
 identifying as a news information spike each period in which the periodic news information count for the watched contact is greater than the weighted average for the watched contact.

6. The method of claim 1, wherein providing further comprises:
 displaying on a display of the electronic device the at least one news information item representative of the at least one subject of the news information spike.

7. The method of claim 6, further comprising displaying the at least one news information item in one or more of an update message, an email summary message, in a user's dashboard graphical interface of a device, and in a user's dashboard graphical interface of a browser.

8. The method of claim 1, wherein providing further comprises presenting the subject of the news information spike.

9. The method of claim 1, further comprising clustering each of the plurality of news information items associated with the at least one watched contact to identify the at least one subject of the news information spike and the at least one representative news information item.

10. The method of claim 1, further comprising:
 acquiring the plurality of contacts from at least one of a user device, a third party contact source, and a user providing the plurality of contacts via a user interface.

11. The method of claim 1, further comprising:
 providing a user interface having an option by which the set of watched contacts of the plurality of contacts is selected.

12. The method of claim 1, further comprising:
 providing a user interface having an option by which the set of watched contacts is automatically determined.

13. The method of claim 1, further comprising:
 a service acquiring from the Internet the news information found within the time period for the plurality of contacts and storing the acquired news information in a news information database.

14. The method of claim 1, further comprising:
 presenting in a user interface of the at least one news information item representative of the news information spike.

15. A non-transitory computer-readable medium having computer-executable instructions for causing a server comprising a processor and an associated contacts and news information database to prioritize and present news information related to contacts, comprising:
 for a plurality of contacts associated with a user of an electronic device, associating news information found within a time period with the contact of the plurality of contacts to which the news information pertains;
 for each watched contact of a set of watched contacts of the plurality of contacts, performing a news information spike analysis of news information associated with the watched contact and determining from the performed news information spike analysis at least one of watched contacts that has experienced a frequency of news information occurring during the time period that is greater than a frequency threshold value and representative of a news information spike during the time period;
 for at least one of the watched contacts that has experienced the news information spike,
  retrieving a plurality of news information items from the news information associated with the watched contact, the plurality of news items comprising news items from different news sources,
  identifying at least one subject of the news information spike, and
  selecting at least one news information item from the plurality of news items representative of the at least one subject of the news information spike; and
 providing the at least one news information item representative of the news information spike to the user via the electronic device.

16. A system for prioritizing and presenting news information, comprising:
 a processor; and
 a contacts and news information database coupled to the processor in which a plurality of contacts and news information about the plurality of contacts are stored, the processor and contacts and news information database configured to:
  for a plurality of contacts associated with a user associating news information found within a time period with the contact of the plurality of contacts to which the news information pertains;
  for each watched contact of a set of watched contacts of the plurality of contacts, perform a news information spike analysis for each watched contact of the set of watched contacts of news information associated with the watched contact and determine from the performed news information spike analysis at least one of the watched contacts that has experienced a frequency of news information occurring during the time period that is greater than a frequency threshold value and representative of a news information spike during the time period;
  for at least one watched contact of the at least one of the watched contacts that has experienced the news information spike,
    retrieve a plurality of news information items from the news information associated with the watched contact, the plurality of news items comprising news items from different news sources,
    identify at least one subject of the news information spike, and
    select at least one news information item from the plurality of news items representative of the at least one subject of the news information spike; and
    provide the at least one news information item representative of the news information spike to the user.

17. The system of claim 16, wherein news information is associated with the plurality of contacts by pairing news information as it is received with a contact of the plurality of contacts to which the news information relates.

18. The system of claim 17, wherein the processor and the contacts and news information database are further configured to attach a pointer from the news information to the contact to which the news information resides.

19. The system of claim 16, wherein to perform the news information spike analysis the processor and the contacts and news information database are further configured to:
  calculate a periodic news information count of the news information associated with the watched contact for a plurality of periods;
  form a statistical model based on the periodic news information count for the watched contact for the plurality of periods from which the frequency of news information occurring during the time period is determined; and
  compare the determined frequency of news information to the frequency threshold value to determine whether a news information spike has occurred, wherein the frequency threshold value is determined from the statistical model.

20. The system of claim 19, wherein the processor and the contacts and news information database are further configured to:
  determine from the statistical model a mean count for the watched contact for the plurality of periods; and
  identify as a news information spike each period where the periodic news information count for the watched contact is greater than the mean count for the watched contact for the plurality of periods.

21. The system of claim 19, wherein the processor and the contacts and news information database are further configured to:
  determine from the statistical model a weighted average for the watched contact for the plurality of periods; and
  identify as a news information spike each period where the periodic news information count for the watched contact is greater than the weighted average for the watched contact.

22. The system of claim 16, wherein the processor and the contacts and news information database are further configured to:
  prioritize the at least one news information item representative over news information presented about other contacts of the plurality of contacts; and
  present the at least one news information item in accordance with the prioritizing.

23. The system of claim 16, wherein to provide the at least one news information item the processor and the contacts and news information database are further configured to:
  present the subject of the news information spike.

24. The system of claim 23, wherein the processor and the contacts and news information database are further configured to cluster each of the plurality of news information items associated with the at least one watched contact to identify the at least one subject of the news information spike and the at least one representative news information item of the at least one news information item.

25. The system of claim 16, wherein the processor and the contacts and news information database are further configured to provide a user interface having an option by which the set of watched contacts of the plurality of contacts is selected.

26. The system of claim 16, wherein the processor and the contacts and news information database are further configured to provide a user interface having an option by which the set of watched contacts is automatically determined.

27. The system of claim 16, the processor and contacts and news information database further configured to present in a user interface the at least one news information item representative of the news information spike.

* * * * *